Aug. 17, 1926.  
M. P. HOLMES  
1,596,433  
FLUID CONTROLLED CLUTCH  
Filed June 1, 1921

Inventor:  
Morris P. Holmes.  
by  
Horace L. Cole  
Atty.

Patented Aug. 17, 1926.

1,596,433

UNITED STATES PATENT OFFICE.

MORRIS P. HOLMES, OF CLAREMONT, NEW HAMPSHIRE, ASSIGNOR TO SULLIVAN MACHINERY COMPANY, A CORPORATION OF MASSACHUSETTS.

FLUID-CONTROLLED CLUTCH.

Application filed June 1, 1921. Serial No. 474,242.

My invention relates to fluid controlled clutches and more particularly to controlling means for said clutches.

An object of my invention is to provide an improved fluid controlled clutch. Another object of my invention is to provide a fluid controlled clutch system having improved means for producing the clutch operating pressure and for its control. A further object of my invention is to provide an improved relief mechanism for fluid controlled clutch systems adapted to prevent overloading thereof. These and other objects of my invention will hereinafter more fully appear.

In the accompanying drawings I have shown for purposes of illustration three forms which my invention may assume in practice.

In these drawings:—

Figure 1:
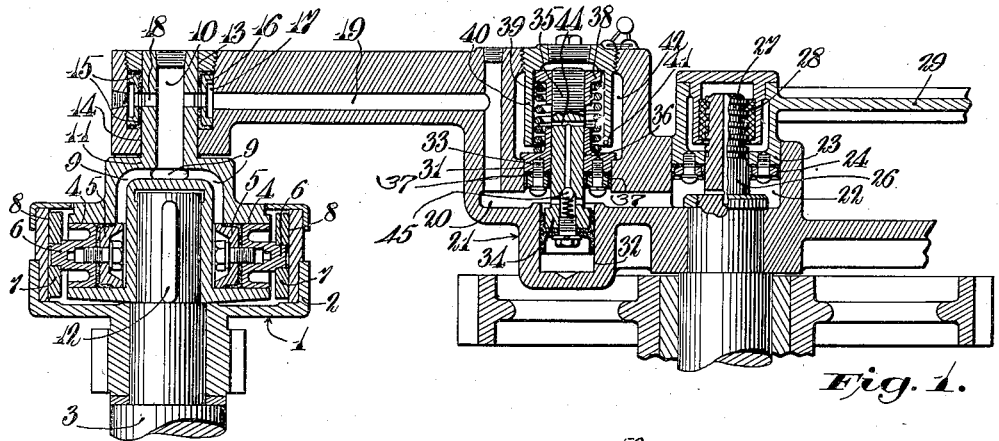
Fig. 1 is a central section through a friction clutch and a fluid operating system therefor.

In the form of my invention illustrated in Fig. 1, I have shown a fluid pressure controlled friction clutch mechanism generally designated 1 and comprising a driven member 2 and a driving shaft 3, the driven member being normally loosely mounted on the driving member except when engaged therewith by the friction control clutch mechanism 1. The clutch mechanism 1 comprises a plurality of cylinders 4 in which pistons 5 are reciprocable, said pistons carrying at their outer ends members 6 adapted to force strips of friction material 7 into engagement with an annular clutch member having a friction surface 8 carried by the driven member 2. Fluid pressure is supplied through branch passages 9—9 to the pistons 5 and fluid pressure so supplied forces out the friction material 7 into engagement with the surface 8 and causes driving of the driven member 2 by the driving shaft 3. The branch passages 9—9 lead from a cylindrical passage 10 formed in a member 11, in which the cylinders 4 are likewise formed, this member being rigidly secured by a key 12 to the member 3. The outer end of the member 11 is reduced as indicated at 13 and is journaled in a bearing 14, being maintained in fluid tight relation thereto by suitable packings 15. The bearing 14 carries an annular fluid supply ring 16 journaled therein and the latter is provided with a groove 17 with which cross passages 18 communicating with the passage 10 at all times are in communication. Fluid is supplied by way of a passage 19 to the groove 17 and accordingly is conducted to the cylinders 4 to act upon the pistons 5. In the present form of control system, I employ a liquid for controlling the operation of the clutch member and accordingly maintain the system full of liquid at all times and by merely applying pressure at one point in the liquid, according to a well-known physical law, am enabled to transmit that pressure to the pistons 5, and so to cause engagement of the clutch. The passage 19 leads by way of a passage 20 through an automatic pressure control mechanism 21, hereinafter described, to a cylinder 22. Within the cylinder 22 is reciprocable a piston 23 having suitable packings 24, the piston being slidable relative to a central guide standard 26 and packed relative thereto by the packings 24. For the purpose of causing reciprocation of the piston, the outer end of the standard 26 is threaded as indicated at 27 and a nut 28 is fixed herein by casting in rigid relation to the piston 23 so that upon rotation of the nut, the piston 23 will be forced in opposite directions in the cylinder 22. A handle 29 is provided for causing rotation of the piston 23 and of the nut 28. It will be obvious that, with a left hand thread such as is shown, motion of the handle away from the observer in Fig. 1 will result in forcing downward the piston 23 and in the placing of the liquid which fills the system under pressure, which pressure will be transmitted to the pistons 5 and so cause engagement of the clutch.

In order to prevent excessive pressure within the system and the overloading of the clutch and the driving means for the driving member 3, I have provided, as stated, suitable pressure controlling means 21. These means in the present form of my invention comprise a pair of cylinders 31 and 32 in which pistons 33 and 34 of different diameters are respectively reciprocable in stepped relation, these pistons being exposed at their adjacent ends to the pressure of the fluid in the system. The piston 34 is provided with a plunger 35 extending through a bore 36 in the piston 33 and packings 37 carried by the piston 33 not only pack the piston with respect to the cylinder 31 but also pack the plunger 35 relative to the bore 36. The plunger 35 is provided at its rear end with a nut threadedly secured thereto as at 38 and between this nut and the piston 34 a spring 39 is placed in compression. An annular collar 40 surrounds the spring 39 and is threadedly secured to the housing of the control valve 21. The collar 40 terminates short of the normal position of the piston 33 but has an abutment surface 41 adapted to be engaged by the rear of the piston 33 after it has moved a predetermined distance. Surrounding the collar 40 is a liquid chamber 42 in which oil or other suitable operating fluid for the system is contained. The plunger 35 is provided with a T-passage 44 controlled by a check valve 45 for permitting the supply of fluid to the system in the event that leakage results in the production of a vacuum in the system upon movement of the piston 23 to its uppermost position.

The mode of operation of this device, it is thought, will be readily apparent. When it is desired to clutch the members 2 and 3 together the handle 29 is rotated in the direction away from the observer and the piston 23 moves downward in the cylinder 22. This places the liquid in the system under pressure and pressure is transmitted to the pistons 5 and so the friction member 7 engages the surface 8 and tends to connect the members 2 and 3. Continued movement of the member 29 will produce increased pressure until the pressure control or relief means comes into operation. The pressure control mechanism 21 regulates the pressure which may be developed by movement of the lever 29. As the pressure rises within the system the piston 33 will be forced upward by the pressure exerted on its lower side until it comes into engagement with the shoulder 41. Thereafter, if the pressure continues to build up by reason of further movement of the member 29, the spring 39 will be further compressed by downward movement of the piston 34. When it is desired to release the clutch, this is accomplished by backward rotation of the nut 28 and in the event that any fluid has been forced out of the system by leakage, it will be replaced by liquid flowing into the system from the chamber 42 through the check valve 45.

Figure 2:
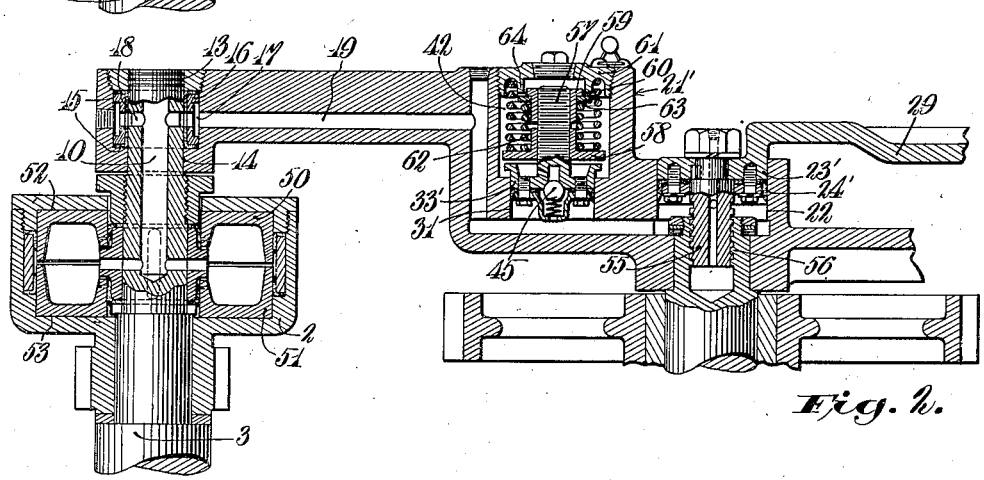
Fig. 2 is a similar section through a different type of friction clutch and a different system of fluid operating means therefor.

In Fig. 2, I have shown a different form of control mechanism, the driven member 2 having fluid pressure supply thereto in a similar manner from the passage 19 by way of a passage 10, but instead of having the cylinders 4 and pistons 5 for forcing the frictional material into engagement with the surface 8 carried by the driven member 2, I have provided a pair of oppositely movable clutch members 50 and 51 slidably but not rotatably mounted on the shaft 3 between which the fluid passing through the passage 10 may be admitted. Upon application of force to the fluid in the passage 19, these members will obviously be forced apart and into engagement with friction surfaces 52, 53 formed on the member 2. Upon reduction in pressure in the system, the friction between the members 50 and 51 and the surfaces 52, 53 will be reduced and the clutch will be released.

In this form of my invention, I have also shown different means for controlling pressure in the system and different means for applying pressure to the liquid in the system. For the purpose of applying pressure to the liquid in the system, I have provided a piston 23' provided with packings 24' and likewise provided with a threaded central extension 55 engaging a stationary nut 56 and operative, upon turning of the handle 29 in the proper direction, to cause the piston 23' to move downwardly in its cylinder 22 thereby placing the fluid in the system under pressure. For the purposes of controlling the pressure in the system, I have shown pressure regulating means 21' comprising a piston 33' reciprocable in a cylinder 31, this piston being provided with a central threaded extension member 57 carrying two spaced annular collars threaded thereon and respectively numbered 58 and 59. The member 58 is depressed by a spring 60 which is placed under compression by an annular collar 61 secured in the housing of the control member 21'. A second spring 62 is placed under pressure between the member 58 and a ring 63 resting against a shoulder on the member 59. This ring, after a limited freedom of movement during initial compression of the spring 60, engages a shoulder 64 formed on the member 61 and thereafter upward motion of the piston 33' results in the compression of two springs instead of a single spring. It will thus be seen that I have provided in this form also two means operative to control the pressure in the system one of which yields prior to the other, and while securing the necessary pressure in the system, I prevent damage from production of an excessive pressure. In this case, also, a check valve 45 is provided to permit the passage of a supply of liquid from a reservoir 42 to the system to replenish any liquid which may be lost by leakage.

Figure 3:
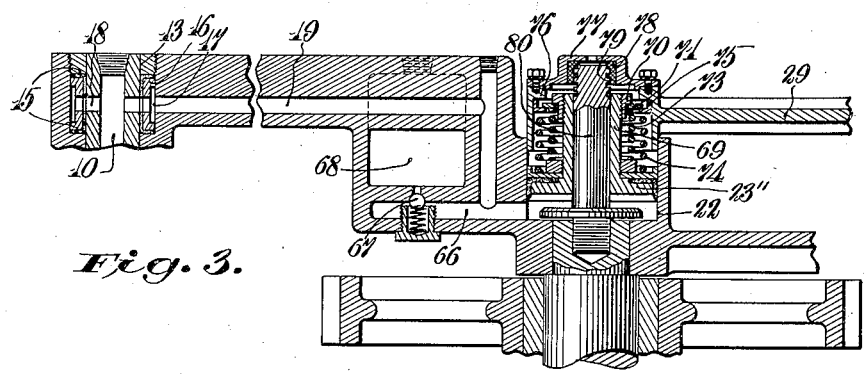
Fig. 3 is a section similar to Figs. 1 and 2 showing a still different type of pressure control system.

In the third form of my improved clutch controlling system, I have omitted illustration of the clutch actuating mechanism proper and it will be understood that a type similar to that shown in Fig. 1 or Fig. 2 or in fact any other suitable fluid pressure control clutch operating mechanism may be employed. In the particular system shown in Fig. 3 it will be evident that the passage 10 leads to a suitable clutch operating mechanism as just mentioned and that the passage 19 at its opposite side communicates with a branch passage 66, the left hand branch of which is communicable through a check valve 67 with a suitable liquid reservoir 68 from which liquid to re-fill the system may be drawn automatically as necessary. The right hand branch of the passage 66 leads to the cylinder 22 in which a piston 23" is reciprocable. This piston is provided with an upstanding collar member 69 on whose upper end is threaded a sleeve 70 which holds in position an annular member 71 between which and another collar adjacent the piston 23" a spring 73 is compressed. A second spring 74 is disposed outside of the spring 73 and extends between the top of the piston 23" and an abutment ring 75 whose position is controlled by a shoulder 76 moving with piston adjusting member 77. This member carries with it a rotatable nut 78 engaging threads 79 formed on the upper end of the standard 80 passing through the piston 23". By reason of the shape of the member 75, a certain clearance is provided between the top of the member 71 and the shoulder 76 and accordingly the nut may be screwed down a certain distance on the standard 80 prior to the engagement of the shoulder 76 with the annular member 71. From the foregoing description, the mode of operation of this form of my invention will be readily apparent. Rotation of the handle 29 in an appropriate direction will cause downward movement of the piston 23" due to the action of the spring 74. The handle 29 may be turned, for the purpose of increasing the pressure in the system, until the shoulder 76 engages the ring 71 and thereafter further movement will also compress the spring 73. It will be noted that I have provided a fluid controlled clutch system in which the closed liquid system formed by the chamber having a wall movable to effect clutch operation, the pressure generating means, and the means forming a conduit connecting the chamber and the pressure generating means, has in communication therewith automatically operating means for maintaining its capacity constant after a predetermined minimum is reached as a result of actuation of the pressure generating means, whereby further actuation of the pressure generating means produces no further movement of the movable chamber wall.

While I have in this specification specifically described three forms which my invention may assume in practice, it will be understood that these forms are for purposes of illustration and that my invention may be modified and embodied in various other forms without departing from its spirit or the scope of the appended claims.

What I claim as new and desire to secure by Letters Patent is:—

1. In combination with a clutch having fluid pressure operating means, control means therefor comprising a closed liquid system communicating with said operating means and completely filled with liquid during clutch operation, means for applying pressure to the liquid in said system, and automatic means for controlling the pressure in said system including means for controlling the capacity of the system while preventing escape of liquid therefrom.

2. In combination with a clutch having fluid pressure operating means, control means therefor comprising a closed liquid system communicating with said operating means and completely filled with liquid during clutch operation, means for applying pressure to the liquid in said system, and automatic means for increasing the capacity of said system without permitting escape of liquid becoming operative when the desired clutch operating pressure is exceeded.

3. In combination, a clutch having operating means adapted for actuation by fluid pressure, fluid pressure generating means, means connecting said fluid pressure generating means to said operating means to transmit actuating pressure thereto, said last mentioned means having at pressures below a predetermined desired maximum, a constant volumetric capacity but an increased volumetric capacity at pressures in excess of said predetermined pressure.

4. In combination, a clutch having operating means adapted for actuation by fluid pressure and comprising a chamber having a movable wall within which pressure acts to effect actuation of the clutch, pressure generating means, and means forming a conduit connecting said chamber and said pressure generating means, said chamber, said pressure generating means and said conduit together forming a closed system whose total enclosed space is increased on movement of said wall controlling clutch application and diminished on actuation of said fluid pressure generating means, said system comprising automatically operating means for maintaining uniform the total enclosed space after a predetermined minimum is reached notwithstanding further actuation of said pressure generating means.

5. In combination with a clutch having fluid pressure operating means, control means therefor comprising a closed fluid system communicating with said operating means, means for placing the system under pressure, and automatic means for differentially regulating the pressure of said fluid to prevent its exceeding a predetermined maximum.

6. In combination with a clutch having fluid pressure operating means, control means therefor comprising a closed fluid system communicating with said operating means, and means for regulating the pressure of said fluid comprising a plurality of members whose movements in opposite directions enlarge the capacity of said system while maintaining it closed.

7. In combination with a clutch having fluid pressure operating means, control means therefor comprising a closed fluid system communicating with said operating means, and a plurality of means automatically operative on continued pressure increase for controlling the movements of said operating means, the directions of movement of said individual controlling means being opposite for similar effects.

8. In combination with a clutch having fluid pressure operating means, control means therefor comprising a closed fluid system communicating with said operating means, and a plurality of oppositely moving means successively operative to control movements of said operating means.

9. In combination with a clutch having fluid pressure operating means, control means therefor comprising a closed fluid system communicating with said operating means, and means for regulating the pressure of said fluid comprising a plurality of members movable in opposite directions to increase the capacity of said system.

10. In combination with a clutch having fluid pressure operating means, control means therefor comprising a closed fluid system communicating with said operating means, and means for regulating the pressure of said fluid comprising a plurality of members movable in opposite directions to increase the capacity of said system, one of said members being movable a predetermined amount prior to movement of the other thereof.

11. In combination with a clutch having fluid pressure operating means, control means therefor comprising a closed fluid system communicating with said operating means, and means for regulating the pressure of said fluid comprising a plurality of members movable in opposite directions to increase the capacity of said system and a single means tending to prevent movements of said members.

12. In combination with a clutch having fluid pressure operating means, control means therefor comprising a closed fluid system communicating with said operating means, means to apply pressure thereto, and independent means including oppositely movable elements to prevent excessive pressure from being applied thereto.

13. In combination with a clutch having fluid pressure operating means, control means therefor comprising a closed fluid system communicating with said operating means, means to apply pressure thereto, and independent automatic means including elements movable in stepped relation for regulating the pressure therein.

14. In combination with a clutch having fluid pressure operating means, fluid pressure applying means, a closed fluid pressure transmitting means communicating with said first mentioned means, and automatic means actuated by the fluid in the transmitting means and independent of said fluid pressure applying means for regulating the pressure applied thereto, said means operating to limit the pressure without permitting escape of fluid.

15. In combination with a clutch, fluid pressure operating means, fluid transmitting means communicating therewith, means to apply pressure to said fluid transmitting means, and independent automatic means including members reciprocable in opposite directions to regulate the pressure applied to said transmitting means.

16. In combination with a clutch having fluid pressure operating means, control means therefor comprising a closed fluid system communicating with said operating means, means to apply pressure thereto, and means for regulating the pressure of said fluid comprising a plurality of members movable in stepped relation.

17. In combination with a clutch, fluid pressure operating means therefor, fluid pressure transmitting means, means to apply pressure to said transmitting means, and means for regulating the pressure of said fluid comprising a plurality of members movable in stepped relation to increase the capacity of said transmitting means.

18. In combination in a clutch mechanism, a driven member, a driving member, means operative on the application of pressure thereto to connect said driven member to said driving member, and automatic means including members movable in opposite directions at different times during a continuous building up of pressure to prevent application of excessive pressure to said first mentioned means.

19. In combination, in a clutch mechanism, a driven member, a driving member, pressure applying means to cause connection of said driven member to said driving member, pressure transmitting means to transmit pressure to said pressure applying means, means to apply pressure to said transmitting means, and automatic means including members movable in stepped relation to regulate said pressure.

20. In combination with a clutch having fluid pressure operating means, control means therefor comprising a closed fluid system communicating with said operating means, and means for regulating the pressure of said fluid comprising a plurality of members movable in opposite directions in stepped relation to increase the capacity of said system.

21. In combination with a clutch having fluid pressure operating means, control means therefor comprising a closed fluid system communicating with said operating means, and fluid actuated means movable in opposite directions for differentially regulating the pressure of said fluid.

22. In combination with a clutch having fluid pressure operating means, control means therefor comprising a closed fluid system communicating with said operating means, and means for regulating the pressure of said fluid comprising a plurality of means having differential pressure surfaces movable to increase the capacity of said system.

23. In combination with a clutch having fluid pressure operating means, control means therefor comprising a closed fluid system communicating with said operating means, and means for regulating the pressure of said fluid comprising a plurality of members having differential pressure surfaces movable in opposite directions to increase the capacity of said system.

24. In combination with a clutch, fluid pressure operating means, control means therefor comprising a closed fluid system communicating with said operating means, means to apply pressure to said system, automatic means to regulate the pressure applied thereto by increasing the capacity of said system, and automatic means to replace leakage in said system.

25. In combinaton with a clutch having fluid pressure operating means, control means therefor comprising a closed fluid system communicating with said operating means, and automatic spring-controlled means including elements movable in opposite directions for regulating the pressure in said system by increasing the capacity thereof.

26. In combination with a clutch, fluid pressure operating means, control means therefor comprising a closed fluid system communicating with said operating means, means to apply pressure to said system, automatic means to regulate the pressure applied thereto, a fluid reservoir, and automatic means to replace leakage in said system from said fluid reservoir.

27. In combination with a clutch having fluid pressure operating means, control means therefor comprising a closed fluid system communicating with said operating means, and means actuated by the fluid in the system for regulating the pressure of said fluid comprising a plurality of members whose movements towards and from each other respectively reduce and enlarge the capacity of the system while maintaining it closed.

28. In combination with a clutch having fluid pressure operating means, control means therefor comprising a closed fluid system, and a plurality of separately yielding means having surfaces subject to the pressure in the system for yieldingly controlling said operating means.

29. In combination with a clutch having fluid pressure operating means, control means therefor comprising a closed fluid system, and a plurality of means for controlling the movements of said operating means, one of which is adapted to yield after the yielding movement of the other.

30. In combination with a clutch having fluid pressure operating means, control means therefor comprising a closed fluid system, means for building up pressure in said system, and a plurality of means yielding at different pressures for controlling the movements of said operating means.

31. In combination with a clutch having fluid pressure operating means, control means therefor comprising a closed fluid system, and a plurality of coaxially disposed means normally stationary as pressure increases but yielding at different pressures for controlling the movements of said operating means.

32. In combination with a clutch having fluid pressure operating means, control means therefor comprising a closed fluid system, and a plurality of coaxially disposed oppositely movable means normally stationary as pressure increases but yielding at different pressures for controlling the movements of said operating means.

In testimony whereof I affix my signature.

MORRIS P. HOLMES.